Dec. 13, 1927.
C. L. GOODRICH
1,652,435
CAM SHAFT COMPARATOR
Filed Aug. 29, 1925
4 Sheets-Sheet 1
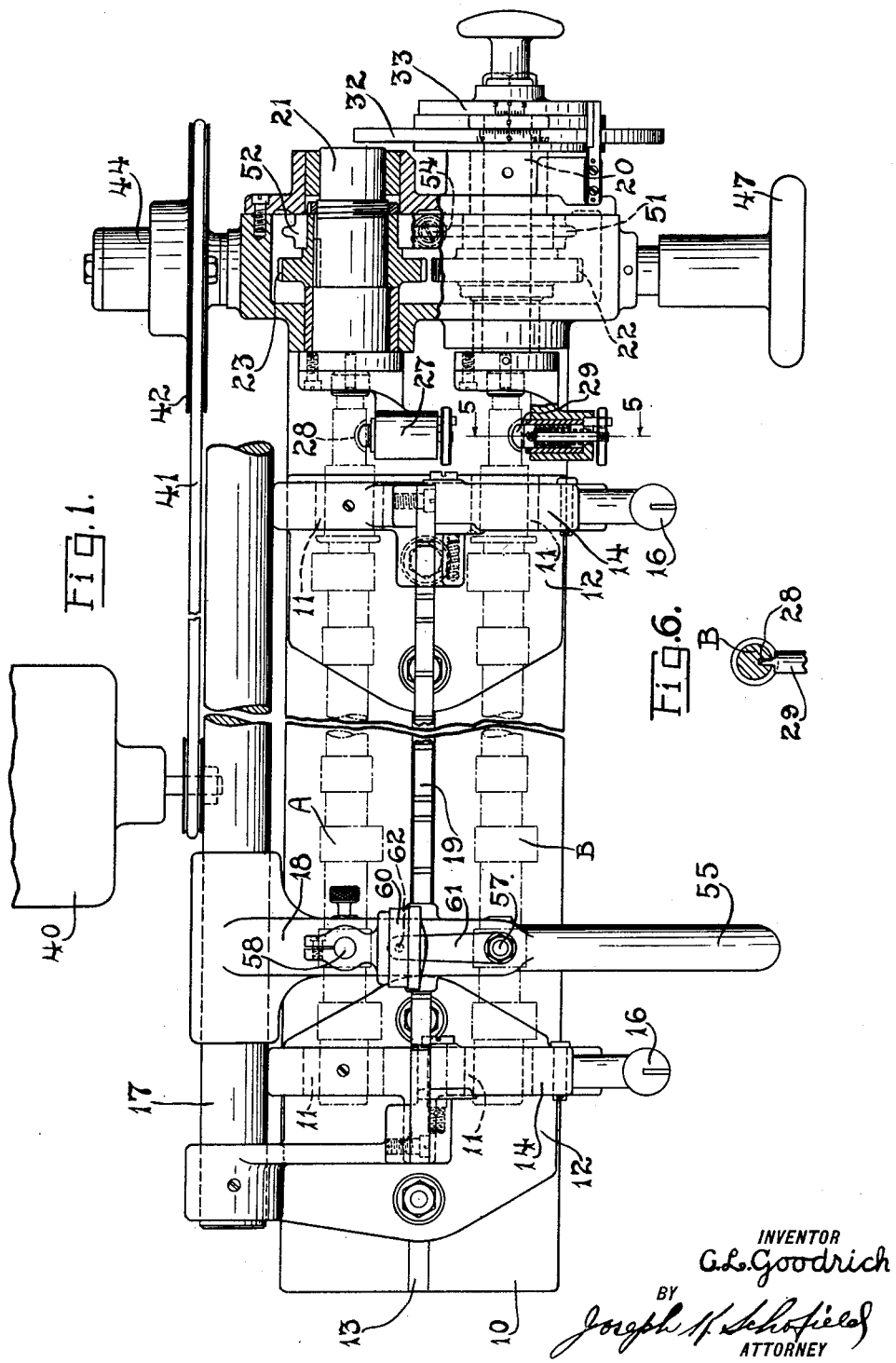
INVENTOR
C.L.Goodrich
BY
Joseph M. Schofield
ATTORNEY

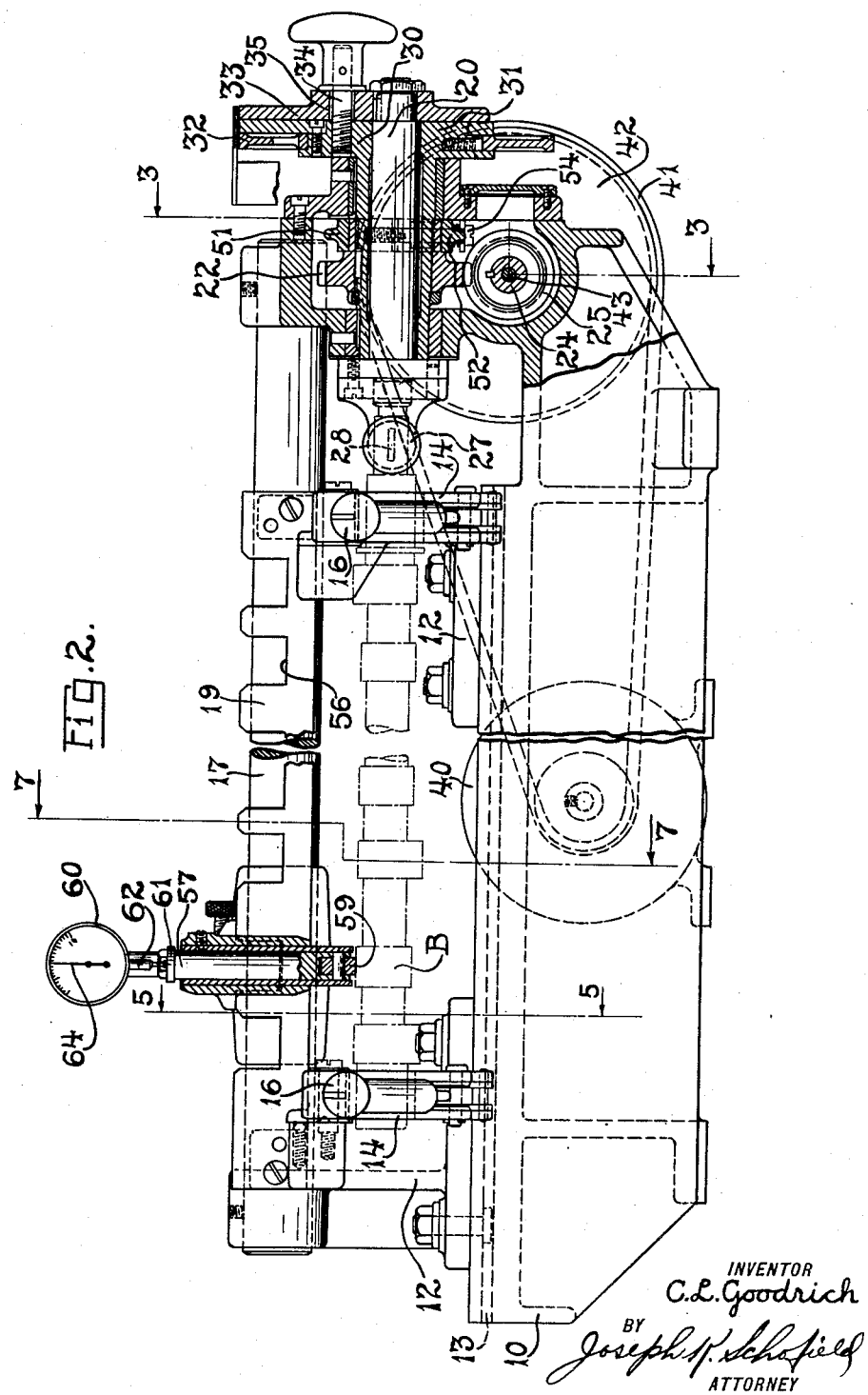

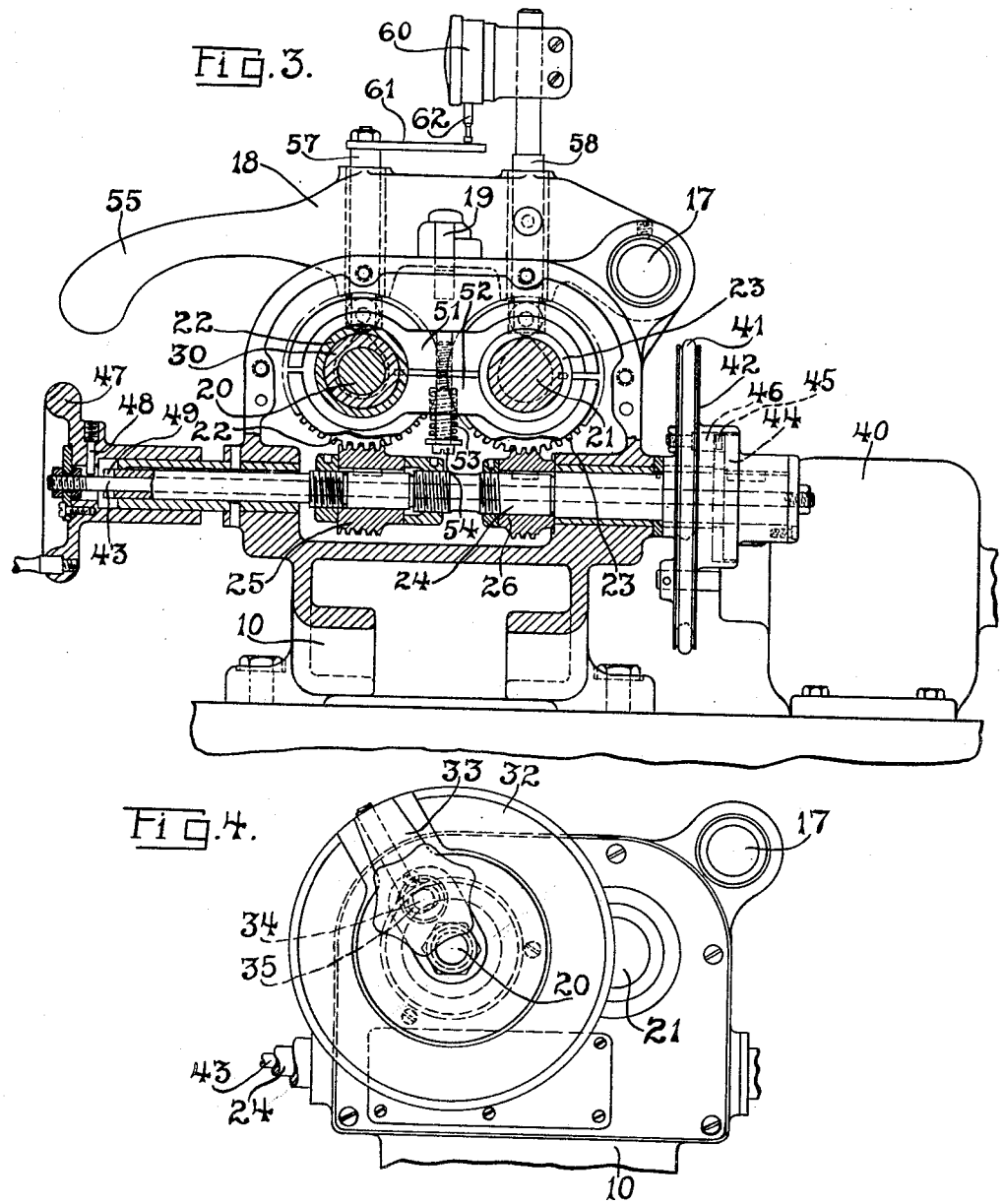

Dec. 13, 1927.  
C. L. GOODRICH  
1,652,435  
CAM SHAFT COMPARATOR  
Filed Aug. 29, 1925  
4 Sheets-Sheet 4
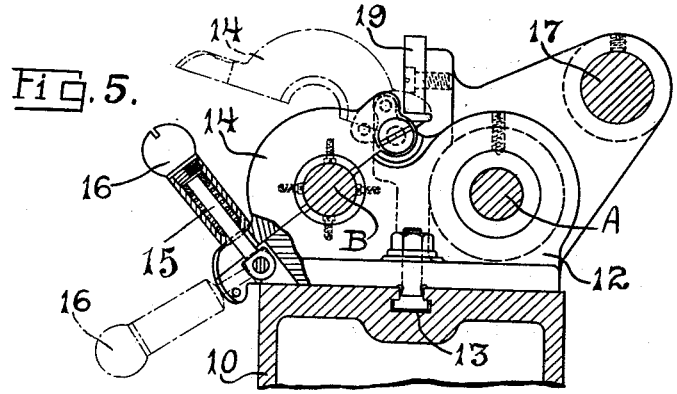
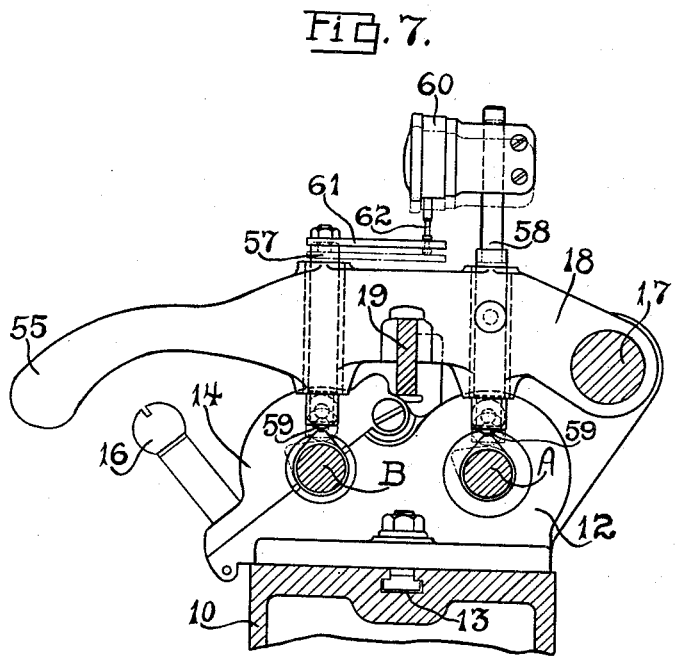
INVENTOR  
C.L. Goodrich  
BY  
Joseph N. Schofield  
ATTORNEY Patented Dec. 13, 1927.

1,652,435

UNITED STATES PATENT OFFICE.

CLARENCE L. GOODRICH, OF HARTFORD, CONNECTICUT, ASSIGNOR TO PRATT & WHITNEY COMPANY, OF NEW YORK, N. Y., A CORPORATION OF NEW JERSEY.

CAM-SHAFT COMPARATOR.

Application filed August 29, 1925. Serial No. 53,430.

This invention relates to testing or gaging devices and in particular to a device for testing or comparing the spaced cam contours on a pair of cam shafts.

An object of the present invention is to provide a device for comparing a cam shaft, or other part having one or more cam contours, with a master cam shaft or with one known to be exactly correct.

One feature of importance is that means are provided for rotating a pair of similar cam shafts synchronously upon parallel axes, one of these shafts being the master or basic cam shaft and the other the cam shaft to be tested or compared therewith.

Another object of the invention is to provide an indicator having parts adapted to contact simultaneously with similar cam contours on both cam shafts and adapted to indicate variations in their contours at all points in their periphery.

A further object of the invention is to provide means to rotatably adjust one of the shafts relative to the other to determine any errors in the angular positions of the cam contours.

It is usual in internal combustion engines to provide a shaft having valve controlling cams for each of the cylinders. As efficient operation of the engine depends very largely upon the accurate opening and closing of the valves, it is essential that the shafts have their cam surfaces formed to an extremely high precision so that this timing of the valves may be properly controlled. To determine whether the required precision is attained in any cam shaft requires that it be compared with one known to be accurate and to give satisfactory results. For this purpose the device forming the present invention has been developed in which a specimen cam shaft can be quickly compared at all of its cam contours with the corresponding contours of a master cam shaft and the errors, if any, in the contour or angular disposition of the successive cam surfaces quantitively determined.

Another object of the invention is to provide a compact device for testing automobile cam shafts adapted for shafts of widely different construction and permitting the shafts to be quickly tested.

With these and other objects in view my invention consists in the features of construction and operation set forth in the following specification and illustrated in the accompanying drawings.

In the accompanying drawings annexed hereto and forming a part of this specification, I have shown my invention embodied in a testing device for automobile cam shafts, but it will be understood that the invention can be otherwise embodied and that the drawings are not to be construed as defining or limiting the scope of the invention, the claims appended to this specification being relied upon for that purpose.

In the drawings:

Figure 1 is a plan view of the complete testing device, parts being broken away to more clearly disclose their construction.

Fig. 2 is a front elevation of the complete testing device having parts of the rotating mechanism and the indicator broken away to more clearly disclose their construction.

Fig. 3 is a transverse view of the device in section taken upon the line 3—3 of Fig. 2.

Fig. 4 is an end elevation of portions of the testing device.

Fig. 5 is a transverse sectional view taken on line 5—5 of Fig. 2.

Fig. 6 is a detail showing the connection between a cam shaft and its driver taken upon line 5—5 of Fig. 1, and Fig. 7 is a sectional view taken on line 7—7 of Fig. 2.

In the above mentioned drawings I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a base; second, supporting means for a master and a specimen cam shaft so that they may be retained in parallelism and readily rotated; third, driving means for the master and specimen cam shafts to positively rotate these shafts in synchronism; fourth, means for rotatably adjusting one of the drivers relative to the other; and fifth, an indicator having parts contacting simultaneously with corresponding cam contours on the master and on the specimen cam shafts.

Referring more in detail to the figures of the drawings, I provide a base 10 having bearings 11 for suitably supporting a master cam shaft A and a specimen cam shaft B so that they may be readily rotated. As the testing device is adapted for use with cam shafts of widely different construction and length, these bearings 11 are made adjustable along the base 10. Also, as the specimen cam shafts B must be placed in and removed from the device expeditiously, the bearings 11 for supporting this member are adapted to be quickly opened. For this purpose the bearings 11 are mounted in blocks 12 adjustable along a suitable way 13 provided in the base 10. The master cam shaft A is positioned toward the rear in permanent bearings. The cam shaft to be tested, B, is forward of the master cam shaft A and is retained in bearings the upper half of which may be swung to an open position as shown at 14 in Fig. 5. A retainer 15 having a spring catch 16 adapted to engage over a projection formed on the upper bearing portion 14 enables the forward bearing 11 to be quickly clamped in closed position. Preferably and as shown, two of these bearings are provided spaced near the opposite ends of the shafts A and B. Also these blocks 12 may be provided with a support 17 extending between them for the indicator 18 and may also support the indicator positioning member 19.

At one end of the device is provided the means for rotating the master and specimen cam shafts A and B in synchronism. For this purpose two parallel shafts 20 and 21 are rotatably mounted in bearings suitably spaced apart, each of the shafts being provided respectively with a worm wheel 22 or 23. The worm wheels 22 and 23 are of the same diameter and have the same number of teeth. Below the gears 22 and 23 and disposed at right angles to the shafts 20 and 21 is a driving shaft 24 having two worms 25 and 26 thereon adapted to engage the worm gears 22 and 23 on the first mentioned shafts 20 and 21. It will be seen from this construction that rotation of the worm carrying shaft 24 will drive shafts 20 and 21 in the same direction and at precisely the same speed. For attaching the cam shafts A and B to drivers, as shown at 27, on the shafts 20 and 21, advantage is taken of a key slot 28 adjacent the end of these cam shafts. As these key slots determine the angular position of the cam shafts A and B in operative position in the internal combustion engines for which they are designed, these slots 28 are used to determine the correct angular position of the shafts A and B during the testing operation and to assure that the cam shafts are initially positioned correctly for testing purposes. As shown in Figs. 1 and 6, the forward ends of the shafts 20 and 21 are provided with projections 27 forming the drivers for the cam shafts A and B in which are provided spring pressed plungers 29. The forward end of these plungers 29 formed as shown in Fig. 6 engage the side walls of the slot 28 in the cam shafts A and B.

As errors may occur in the relative angular positions of the cam contours on the shaft B being tested, it is essential that means be provided to rotate one of the shafts 20 or 21 a limited distance while the other remains stationary. For this purpose the worm wheel 22 for driving the specimen cam shaft B is mounted upon a sleeve 30, this sleeve surrounding the shaft 20 carrying the driver 27. By referring to Fig. 2, the construction of these members for the specimen cam shaft B will be clearly understood. The sleeve 30 on which the worm wheel 22 is keyed is provided with a hub 31 at its outer end to which a graduated disc 32 is secured. The shaft 20 also has at its outer end a fragmentary graduated disc portion 33 keyed directly thereto. By means of a screw 34 passing through an arcuate slot 35 in the last mentioned disc and threadedly entering the hub 31 of the sleeve 30, the sleeve 30 and shaft 20 may be disengaged and manually turned one relative to the other. Also they may be rigidly clamped together by means of the screw 34 in different angular positions relative to each other. Rotation of the driving worms therefore rotates the master cam shaft A and the specimen cam shaft B simultaneously and uniformly in any adjusted position.

For convenience power means may be provided for driving the worm carrying shaft 24 and for this purpose a small electric motor 40 is mounted in the rear portion of the base 10 which is drivingly connected by a belt 41 to a pulley 42 on the rear end of the worm shaft 24. In order to start and stop rotation of the worm shaft 24 while the pulley 42 is constantly rotated, means are provided to engage and disengage the pulley 42 from the worm shaft 24. A rod 43 extending through the shaft 24 has keyed to its rear end a head portion 44 provided with a projecting key 45. This key 45 is adapted to engage an abutment 46 on the pulley 42. Movement therefore axially of this rod 43 engages and disengages this key or projection 45 to stop or start the rotation of the worm shaft 24. Preferably this rod 43 may be moved axially by a handle 47 fitting over the forward end of the worm shaft 24. Movement forward of this handle 47 serves to engage the key 45 with the abutment 46 and thus rotate the worm shaft 24 from the motor 40. Movement rearward of the handle 47 engages a projection 48 on the handle with a slot 49 formed in the worm wheel driving shaft 24 so that while the power driving connection is disengaged the handle 47 may be rotated manually to slowly rotate the worm shaft 24 and the driving shafts 20 and 21 for rotating the cam shafts A and B.

To prevent any tendency for the shafts 20 or 21 to move slightly due to lost motion between members of the driving means therefor, I provide a brake engaging the hub portions on the worm gears 22 and 23. This brake comprises two generally similar members 51 and 52 having portions engaging the hubs of the gears 22 and 23. These members 51 and 52 are resiliently forced together by means of a spring 53 surrounding a screw 54 passing through member 52 and threaded into member 51. By rotating screw 54 the pressure of the members 51 and 52 against gears 22 and 23 may be adjusted.

The actual testing operation of the cam shafts A and B is performed by a special form of indicator 18 mounted for oscillation into and out of position in contact with the two cam shafts A and B. In order to properly support the indicator 18, a large bar or rod 17 extends longitudinally of the device and parallel with the cam shafts A and B, this bar or rod 17 being fixed accurately and firmly in suitable bearings. Adapted to oscillate upon this bar is a frame or body member 18 having a handle 55 at its forward end and adapted to carry the novel form of indicator presently to be described. To position the indicator 18 longitudinally of the cam shafts A and B to engage the indicator 18 with the successive cam contours thereon, a recessed plate 19, shown clearly in Fig. 2, is provided. This plate has notches 56 cut therein corresponding to the positions of the cam contours on the cam shafts A and B, one of these recessed plates being provided for each type of cam shaft being inspected. In operative position a surface of the indicator 18 rests upon the lower flat surface of these recesses 56 and thus retains the member 18 in its operative position.

The oscillating frame 18 forming the principal part of the indicator is provided with two parallel plungers 57 and 58 having at their lower ends rollers 59 adapted to contact with the cam contours of the cam shafts. These plungers 57 and 58 are spaced apart a distance equal to the distance apart of the cam shafts A and B. One of these plungers 58 carries the body member 60 of the indicator which preferably and as shown, is of the dial type. This dial indicator 60 is adjustably attached vertically to the upper end of the plunger 58. The forward plunger 57 or the plunger adapted to contact with the specimen cam shaft B is provided at its upper end with an arm 61 outstanding from and extending to a point below the dial indicator 60 so that the outer end of this arm 61 contacts with the movable member 62 of the dial indicator 60. It will be seen from this construction that if the two plungers 57 and 58 rise and fall simultaneously, no movement of the pointer 64 will take place. It will therefore be apparent that if the cam surfaces of the two shafts correspond precisely and the cam shafts are rotated synchronously, no movement of the indicator pointer 64 will take place. However, if movement of the pointer 64 of the dial indicator 60 does take place, it will be apparent that movement of the plungers 57 and 58 is not precisely uniform and that the contours of the cams in contact with the rollers 59 do not precisely correspond. The amount of error in the contours can be determined directly from the amount the pointer 64 of the indicator 60 moves. Also the testing of the contours can be repeated with the shafts A and B in different relative rotative positions to determine errors in rotative dispositions of the cams. The operation of comparing each pair of corresponding cam contours on shafts A and B is repeated from one end of the shafts to the other. For this purpose the indicator 18 is oscillated about its supporting rod 17, moved axially, and then dropped into an adjacent notch of the spacer member 19.

What I claim is:

1. A testing device for cam shafts comprising in combination, a base, means for rotatably mounting two cam shafts to be compared, means to synchronously rotate said cam shafts, and an indicator adapted to simultaneously contact with corresponding cam surfaces on said cam shafts.

2. A testing device for cam shafts comprising in combination, a base, means for rotatably mounting two cam shafts to be compared, means to synchronously rotate said cam shafts, means permitting rotative adjustment of one shaft relative to the other, and an indicator adapted to simultaneously contact with corresponding cam surfaces on said cam shafts.

3. A testing device for cam shafts comprising in combination, a base, means for rotatably mounting two cam shafts to be compared, means to synchronously rotate said cam shafts, means permitting rotative adjustment of one shaft relative to the other, an indicator adapted to simultaneously contact with surfaces of said cam shafts, and means permitting oscillation of said indicator into and out of operative position.

4. A testing device for cam shafts comprising in combination, a base, means for rotatably mounting two cam shafts to be compared, means to synchronously rotate said cam shafts, means permitting rotative adjustment of one shaft relative to the other, an indicator adapted to simultaneously contact with surfaces of said cam shafts, and a support permitting axial and oscillatory movement of said indicator.

5. A testing device for cam shafts comprising in combination, a base, means for rotatably mounting two cam shafts to be compared, means to synchronously rotate said cam shafts, and an indicator having members adapted to simultaneously contact with corresponding cam surfaces of said cam shafts while said shafts are being rotated.

6. A testing device for cam shafts comprising in combination, a base, means for rotatably mounting a pair of cam shafts to be compared, means to synchronously rotate said cam shafts, plungers movably mounted and adapted to simultaneously engage corresponding cam contours on said shafts, and means to indicate differences in movements of said plungers while said shafts are being rotated.

7. A testing device for cam shafts comprising in combination, a base, means for rotatably mounting a pair of cam shafts to be compared, means to synchronously rotate said cam shafts, plungers movably mounted and adapted to simultaneously engage corresponding cam contours on said shafts, an indicator body member secured to one of said plungers, and an indicator pointer actuating member adapted be moved by said other plunger, whereby errors in the cam contours may be indicated during rotation of said shafts.

8. A testing device for cam shafts comprising in combination, a base, means for rotatably mounting a pair of cam shafts to be compared, means to initially position said shafts rotatably relative to each other, means permitting relative rotative adjustment of said shafts, plungers movably mounted and adapted to simultaneously engage corresponding cam contours on said shafts, and means to indicate differences in movements of said plungers while said shafts are being rotated.

9. A testing device for cam shafts comprising in combination, a base, means for rotating a pair of cam shafts in synchronism, and an indicator having a pair of members parallelly mounted and in contact with said cam shafts, whereby relative movement of said members will indicate variations in contour of said cam shafts.

10. A testing device for cam shafts comprising in combination, a base, means for rotating a pair of cam shafts in synchronism, an indicator frame having members parallelly mounted and in contact with said cam shafts, one of said members carrying the indicator body member and the other member adapted to actuate the pointer member of the indicator whereby relative movement of said members will indicate variations in contour of said cam shafts.

In testimony whereof, I hereto affix my signature.

CLARENCE L. GOODRICH.